J. B. BARTHOLOMEW.
STEERING GEAR FOR VEHICLES.
APPLICATION FILED OCT. 10, 1907.

1,095,260.

Patented May 5, 1914.
4 SHEETS—SHEET 3.

Witnesses
N. E. Costello
George E. Edelin

Inventor
John B. Bartholomew
By H. H. Bliss
his Attorney

J. B. BARTHOLOMEW.
STEERING GEAR FOR VEHICLES.
APPLICATION FILED OCT. 10, 1907.
1,095,260.
Patented May 5, 1914.
4 SHEETS—SHEET 4.
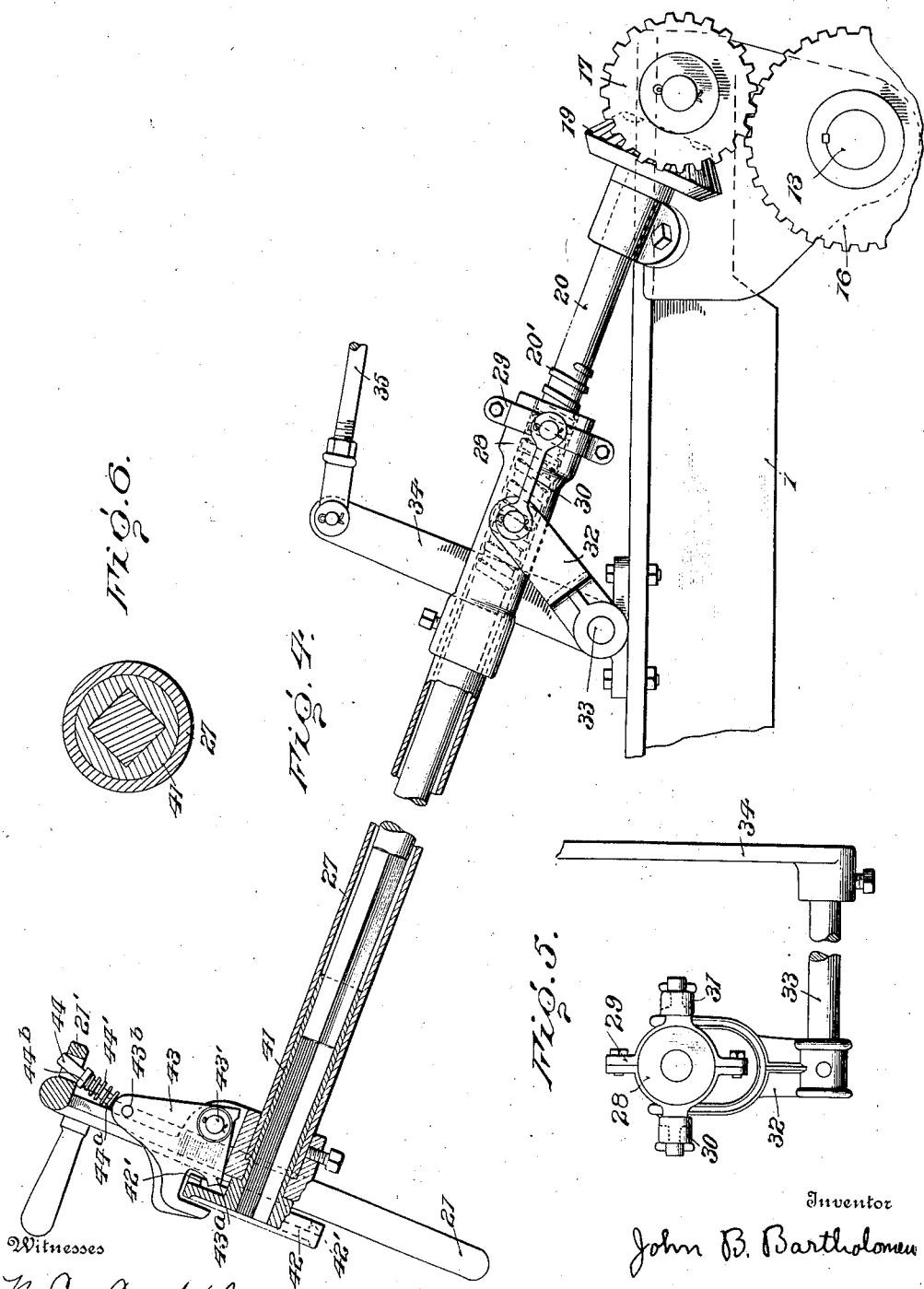
Witnesses
N. E. Costello.
George E. Edelin
Inventor
John B. Bartholomew
By H. H. Bliss
his Attorney

UNITED STATES PATENT OFFICE.

JOHN B. BARTHOLOMEW, OF PEORIA, ILLINOIS, ASSIGNOR, BY MESNE ASSIGNMENTS, TO AVERY COMPANY, A CORPORATION OF ILLINOIS.

STEERING-GEAR FOR VEHICLES.

1,095,260.

Specification of Letters Patent.

Patented May 5, 1914.

Application filed October 10, 1907. Serial No. 396,848.

*To all whom it may concern:*

Be it known that I, JOHN B. BARTHOLOMEW, a citizen of the United States, residing at Peoria, in the county of Peoria and State of Illinois, have invented certain new and useful Improvements in Steering-Gear for Vehicles, of which the following is a specification, reference being had therein to the accompanying drawing.

This invention relates to traction engines and more particularly to the steering gear of such engines.

When heavy traction engines steered by hand are driven over rough ground, the muscular effort required by the engineer or operator is such as to render his work extremely fatiguing. Under such conditions it is highly desirable that power-driven steering gear may be used, thus doing away with the most fatiguing part of the engineer's work and enabling him to devote his attention more fully to the operation of the machine.

One of the objects of my present invention is the provision of power-driven steering gear for traction engines that is simple in construction and reliable in operation.

A further object is the provision of a power-driven steering gear that may readily be converted to a hand-operated gear.

Further objects which I have had in mind will appear from the following description taken in connection with the accompanying drawings which illustrate a practical embodiment of the invention.

Figure 1:
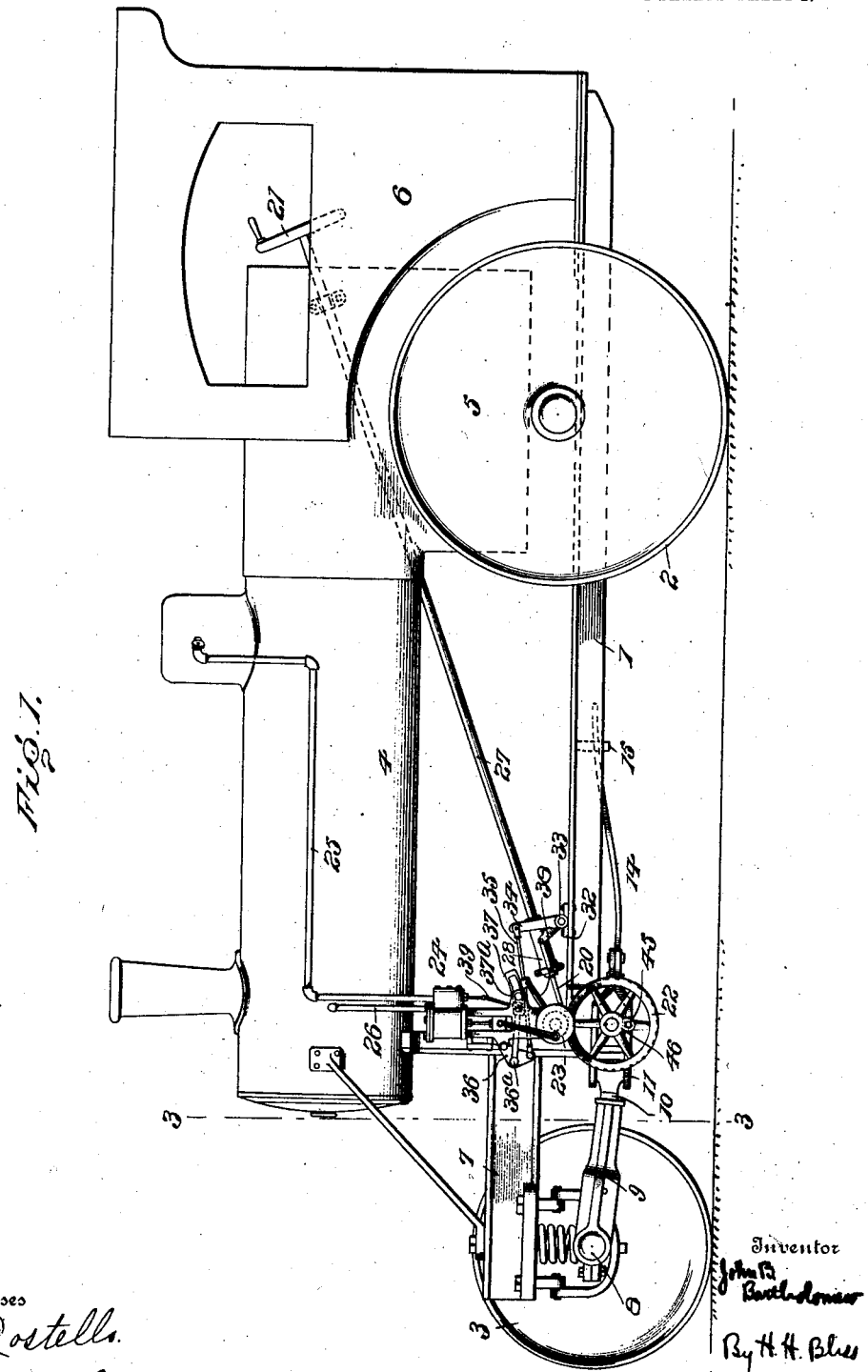
Figure 2:
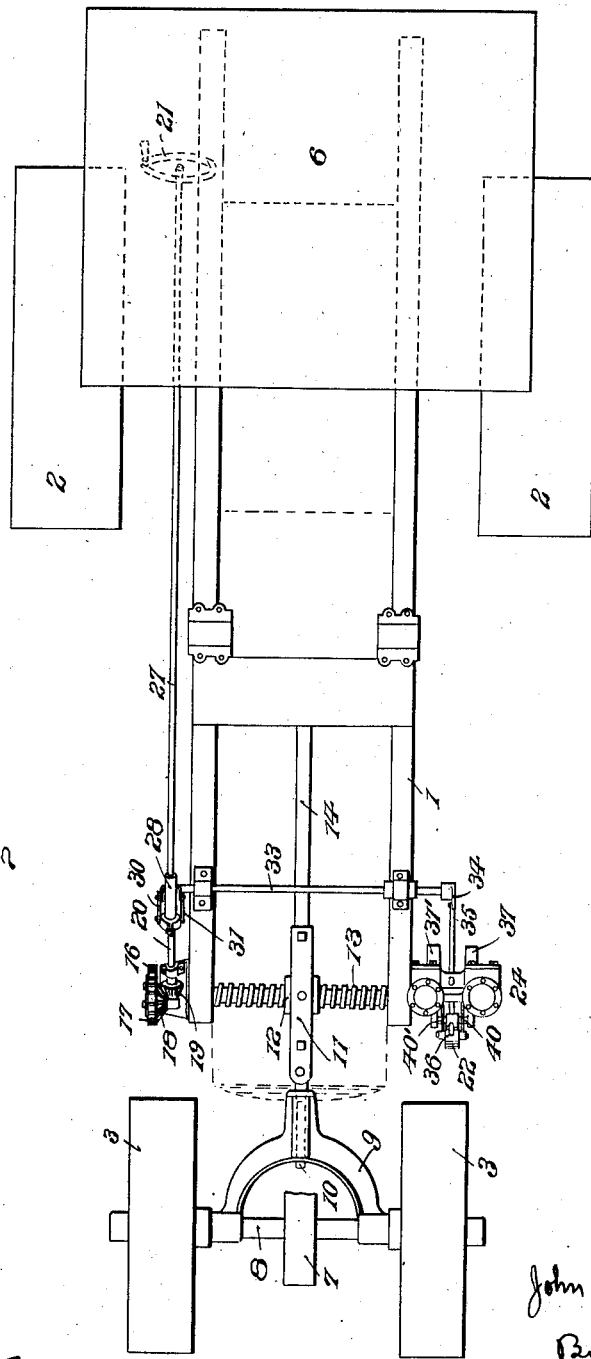
Figure 3:
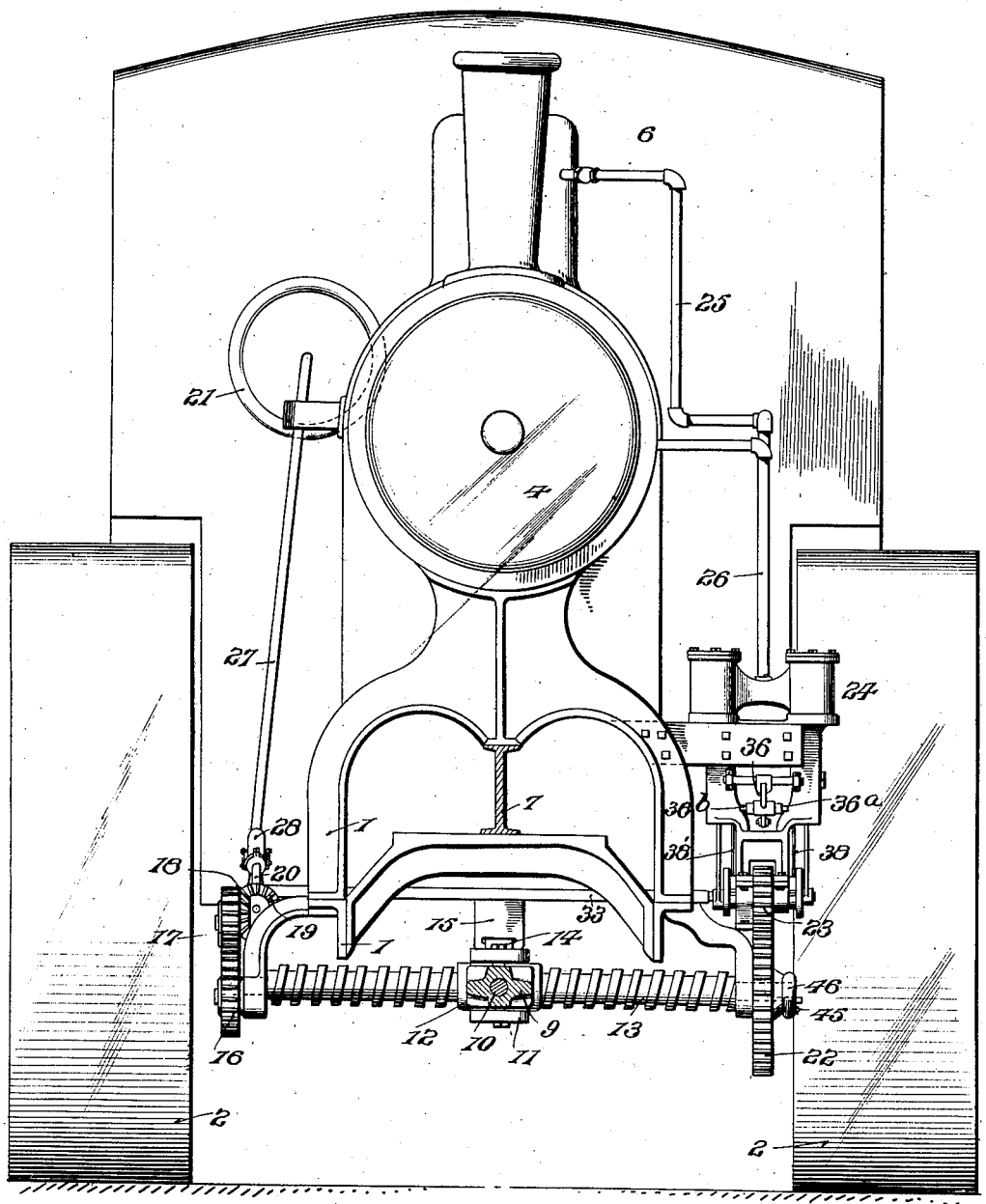

Referring to the drawings; Figure 1 is a side elevation of a traction engine provided with the improved steering gear. Fig. 2 is a top plan view of the same. Fig. 3 is a sectional elevation taken on the line 3—3 of Fig. 1. Fig. 4 is a side elevation partly in section of a part of the steering gear. Fig. 5 is an end elevation of a portion of the gear shown in Fig. 4. Fig. 6 is a sectional view taken on the line 6—6 of Fig. 4.

My improved steering gear is shown in the drawings as applied to a traction engine of the double-undermounted type such as is shown in the patent to Springer No. 842,589, January 29, 1907.

To permit a clear showing of the invention, proper, the frame-work, boiler, cab, etc., are shown in conventional outline and the main engines are entirely omitted.

Referring to the details of construction as shown, 1 is the main frame, carried upon the drive-wheels 2—2 and the steering wheels 3—3. The frame 1 supports the boiler 4, furnace 5, and the operator's cab 6, as indicated and as shown in detail in the patent above referred to. The main engines (not shown) are to be mounted on the main frame forward of the furnace and below the boiler.

An I-beam 7 projects forward from the main frame so as to overhang the axle 8 of the steering wheels, the axle being pivotally secured to the beam. A steering fork 9 is secured to the axle 8 and projects rearward to receive the telescoping rod 10 which is mounted in the forward end of a U-shaped frame 11. The frame 11 is pivoted on a vertical axis to the nut 12 on the steering screw 13. A tail-piece 14 which is rigidly secured to the frame 11 has its free end slidably mounted in the depending bracket 15. By the rotation of the screw 13 which is held against longitudinal movement, the nut 12 may be moved to the right or left and the steering axle 8 swung on its pivot to determine the course of the machine.

On one end of the screw 13 is mounted a spur-gear 16 which meshes with a second gear 17 which carries a bevel-pinion 18 meshing in turn with the bevel pinion 19 mounted on the end of a shaft 20. This last-named shaft extends upward to the rear of the engine and may, when desired, be turned by means of the hand-wheel 21 to steer the engine in the usual way. As stated above such manual steering becomes extremely arduous in the case of large heavy machines when driven over rough ground and I therefore provide power means under the control of the engineer to effect the steering. Preferably the power means is operatively connected with the steering screw 13 and the mechanism employed for hand-steering is largely utilized as controlling means for the power devices.

22 is a spur-gear mounted on the end of the screw opposite the gear 16. This gear meshes with and is driven by a pinion 23 mounted on the crank-shaft of an engine designated, as an entirety, by 24. This engine is rigidly secured to the main frame work and as shown has two cylinders and is provided with a link cut-off and reversing gear of the single-eccentric type. A pipe 25 leading from the steam dome of the boiler, supplies steam to the engine and its exhaust is carried through pipe 26, to the main exhaust chamber at the front end of the boiler.

To secure the control of the engine 24 by movement of the hand-wheel 21, the latter is not mounted directly upon the shaft 20, but secured to a sleeve 27 which surrounds said shaft and carries at its lower or forward end a nut 28. This nut engages threads at 20' on the shaft 20 so that a rotary movement of the nut with respect to the shaft moves the former longitudinally.

At its forward end the nut 28 is grooved to receive a strap 29 which is connected by means of links 30, 31 to the forked crank arm 32. The arm 32 is mounted at one end of the shaft 33 which extends across the main frame and carries at its opposite end a second crank arm 34. 35 is a link connecting the end of arm 34 with a depending lever arm 36 pivotally mounted on the frame of the engine 24. The links 37—37' of the valve gear are pivotally mounted in the manner indicated at 37$^a$ so as to be oscillated by the eccentric rods 38—38'. The valve connecting rods carry at their lower ends blocks which slidably engage the slots of links 37—37' in the well-known manner. In the drawing only the connecting rod 39 of the outside cylinder is shown, but it will be understood that the valve gear construction is in duplicate. Links 40—40' are pivotally connected at 36$^a$ and 36$^b$, respectively, to the depending lever 36 and at their opposite ends these links are secured to the slidable blocks of the valve connecting-rods 39—39'.

The operation of the mechanism when it is desired to steer the engine by power is as follows: The engineer by turning hand-wheel 21 gives to the nut 28 a combined rotary and longitudinal movement. The longitudinal travel of the nut 28 by means of the intermediate connections rocks the shaft 33 so as to swing the crank arm 34 and the connected lever 36. The movement of the last-named lever by means of the connecting links 40—40' moves the sliding blocks of the valve-connecting rods from their neutral positions in the slots of the links 37—37', thus starting the engine 24. The rotation of the engine turns the gear wheel 22 and the steering screw 13, thus shifting the nut 12 and turning the axle 8 upon its pivot to change the course of the machine. Inasmuch as the shaft 20 is connected through the gearing 16, 17, 18 and 19 with the screw 13, the rotation of the latter by the engine turns the shaft 20 in a manner to restore the nut 28 to its normal position and the valve gear of the engine 24 to its corresponding neutral position, thus stopping the engine. It is clear that the angling movement given to the steering wheels 3 in this manner is substantially proportional to the distance through which the hand-wheel is turned, for the engine, started by the first movement of the hand-wheel, will continue to run as long as the operator continues to turn the hand-wheel. But as soon as the hand-wheel is stopped the rotation of the steering screw 13 quickly restores the valve-gear to its neutral position and stops the engine. To turn the steering wheels 3 in the opposite direction the movement of the hand-wheel 21 is reversed, thus shifting the nut 28 in the opposite direction so as to reverse the engine 24. Thus it will be seen that my improved steering gear operates in such a manner that the steering of the engine is accomplished by movements of the hand-wheel precisely like the movements of the hand-wheel in the old manually-operated type of steering gear, but that the operator is entirely relieved of the undue muscular exertion incident to the manually-operated gear.

As has been previously stated, my steering gear is so constructed that the engine may, if desired, be steered directly by hand; and the construction is such that the change from power to hand-steering may readily be accomplished. For this purpose the upper rear end of the shaft 20 is squared to fit and freely slide within a sleeve 41 which sleeve fits within the upper end of sleeve 27 and the hub of the hand-wheel 21. The outer end of the sleeve 41 carries a clutch-wheel 42 provided on its inner face with a series of notches 42'.

43 is a locking lever pivoted at 43' on the hub of hand-wheel 21 and provided with a finger 43$^a$ adapted to enter the notches 42'. A pin 44 has one of its ends pivotally connected at 43$^b$ to the lever 43 while its outer end passes through a slotted lug 21' carried by the rim of wheel 21. A spring 44' is mounted upon this pin between a stationary flange 44$^a$ and movable flange 44$^b$. It will be seen that the lever-arm 43 and the pin 44 constitute a toggle lever device adapted to be held in either of its extreme positions by the spring 44'.

When the engine is to be steered by power the locking lever is in the position shown in Fig. 4, the hand-wheel then being disconnected from the clutch wheel 42 and the shaft 20. When, however it is desired to steer by hand the toggle-lever clutch is thrown forward to its other extreme position with the finger 43$^a$ in engagement with one of the notches 42', thus locking the hand-wheel to the clutch-wheel 42 so that rotary movement of said hand-wheel turns the nut 28 and the shaft 20 simultaneously, thus giving no movement to the engine valve gear while the rotation of the shaft 20 in either direction turns the steering wheels 3 as desired by the operator.

I prefer that the engine 24 be disconnected from the steering screw 13 when the steering is to be done by hand and any suitable means to effect this purpose may be provided. In the present instance, I have provided a removable locking pin 45 mounted in a collar 46 which is keyed to the end of the screw shaft 13, and serves to retain the gear 22 in position. The pin 45 is normally in position to lock gear 22 to the screw shaft 13 but may be removed to allow said gear to turn freely on the screw shaft.

What I claim is:

1. In a dirigible vehicle, the combination of the steering axle, angling mechanism therefor, a power driving means, controlling mechanism for said driving means, a manual driving means, each of said driving means being adapted to operate the angling mechanism, means for operating the said controlling mechanism, operative connections between the last named operating means and the manual driving means, a common operating handle for the said operating means and the manual driving means, said handle being permanently connected with the means for operating the said controlling mechanism, and a spring-pressed toggle lever forming a readily separable connection between the operating handle and the manual driving means.

2. In a dirigible vehicle, the combination of the steering axle, angling mechanism therefor, a motor adapted to drive the angling mechanism, a manual driving means for the angling mechanism, a control mechanism for the motor, means mounted on the manual driving means for operating the control mechanism, a handle for said operating means, and a spring-pressed toggle lever forming a readily separable connection between said handle and the manual driving means.

3. In a dirigible vehicle, the combination of a steering axle, angling mechanism therefor, a manual driving means, a power driving means, each adapted to operate the angling mechanism, means for controlling the power driving means, an operator's handle for moving said controlling means, said handle being disposed at a point distant from the angling mechanism, operative connections between the manual driving means and the said controlling means, and means adjacent the operator's handle constituting a readily separable connection between said handle and the manual driving means, whereby the handle can at will be moved to either manually drive the angling mechanism or to control the power driving means.

4. In a traction engine, the combination of a steering axle, at the front end of the engine, angling mechanism for the axle adjacent thereto, power means adapted to drive the angling mechanism, means for controlling the said power driving means, a manual driving means for the angling mechanism comprising a rotary shaft geared thereto and extending to the rear part of the engine, means for operating the said controlling means comprising a sleeve surrounding the said rotary shaft and having a threaded connection therewith, an operator's handle on the rear end of said sleeve, and means adjacent said handle constituting a separable connection between the handle and the rotary shaft, whereby the handle can at will be moved to either manually drive the angling mechanism or to control the power driving means.

5. In a steering gear for vehicles and the like, the combination of angling mechanism, a power driving means for said mechanism, controlling mechanism for said driving means, a rotary shaft geared to the angling mechanism, a sleeve mounted on said shaft to rotate therewith or relatively thereto, means for moving the sleeve axially when rotated relative to the shaft, a handle disposed at a distance from the angling mechanism for turning said sleeve, operative connections between the sleeve and the said controlling mechanism, and means adjacent said handle for locking the sleeve against rotation relative to the shaft.

6. In a steering gear for vehicles and the like, the combination of angling mechanism, a motor for driving said mechanism, controlling mechanism for said motor, a rotary shaft geared to the angling mechanism, a sleeve surrounding said shaft and having a screw-threaded connection therewith, operative connections between the sleeve and the motor controlling mechanism, a handle secured to the sleeve, and clutch mechanism between the handle and rotary shaft.

7. In a steering gear for vehicles and the like, the combination of angling mechanism comprising a rotatable screw and a nut thereon, a motor geared to said screw, control mechanism for said motor, a rotary shaft geared to said screw, a sleeve surrounding said shaft and having a screw-threaded connection therewith, operative connections between the sleeve and the motor controlling mechanism, and means for rotating the sleeve.

8. In a steering gear for vehicles and the like, the combination of angling mechanism comprising a rotatable screw and a nut thereon, a motor geared to said screw, controlling mechanism for said motor, a rotary shaft geared to said screw, a sleeve surrounding said shaft and having a screw-threaded connection therewith, operative connections between the sleeve and the motor controlling mechanism, a handle secured to the sleeve and clutch-mechanism between the handle and rotary shaft.

9. In a steering gear for vehicles and the like, the combination of angling mechanism, a motor for driving said mechanism, controlling mechanism for said motor, a rotary shaft geared to the angling mechanism, a sleeve surrounding said shaft and having a screw-threaded connection therewith, operative connections between the sleeve and the motor controlling mechanism, a hand-wheel rigidly secured to the sleeve, and a clutch device on the hand-wheel adapted to connect the latter with the rotary shaft.

10. In a steering gear for vehicles and the like, the combination of angling mechanism, a motor for driving said mechanism, controlling mechanism for said motor, a rotary shaft geared to said angling mechanism, a sleeve surrounding said shaft, a grooved nut rigid with the sleeve and engaging threads on said rotatable shaft, a strap engaging the groove of said nut, connections between said strap and motor controlling mechanism, and means for turning the sleeve.

11. In a steering gear for vehicles and the like, the combination with angling mechanism comprising a rotatable screw and a nut thereon adapted to be moved axially by rotation of the screw, of a motor geared to one end of said screw to drive the same, and manual driving mechanism geared to the other end of the screw.

12. In a steering gear for vehicles and the like, the combination with angling mechanism comprising a rotatable screw and a nut thereon adapted to be moved axially by rotation of the screw, of a motor geared to one end of the screw to drive the same, a clutch device between the motor and screw, and manual driving mechanism geared to the other end of the screw.

13. In a steering gear for vehicles and the like, the combination with angling mechanism comprising a rotatable screw and a nut thereon adapted to be moved axially by the rotation of the screw, of a motor geared to one end of the screw to drive the same, a manually operable rotatable shaft geared to the other end of the screw, controlling mechanism for the motor, means for operating said controlling mechanism comprising a sleeve surrounding the rotatable shaft, a handle mounted on the sleeve, and clutch mechanism between said handle and the rotatable shaft.

14. In a steam driven traction engine, the combination with the steering axle and angling mechanism therefor, of an auxiliary steam engine to operate the angling mechanism, a link valve gear adapted to start, stop and reverse said engine, a rotatable shaft geared to the angling mechanism and adapted to operate the same, a sleeve surrounding said shaft and having a screw-threaded engagement therewith, connections between the sleeve and the said valve gear, manual means for turning the sleeve, and clutch mechanism between said sleeve and shaft.

15. In a steering gear for vehicles and the like, the combination of angling mechanism, power actuated means for driving said mechanism, controlling mechanism for said power-actuated means, a rotary shaft geared to the angling mechanism, a sleeve surrounding said shaft and having a screw threaded connection therewith, operative connections between the sleeve and said controlling mechanism, a handle mounted on the sleeve, and clutch mechanism between the handle and rotary shaft.

16. In a steering gear for vehicles and the like, the combination of angling mechanism comprising a rotatable screw and a nut thereon, power driving means geared to said screw, control mechanism for said power driving means, a rotary shaft geared to said screw, a sleeve surrounding said shaft and having a screw-threaded connection therewith, operative connections between the sleeve and the said control mechanism, and means for rotating the sleeve.

17. In a steering gear for vehicles and the like, the combination of angling mechanism comprising a rotatable screw and a nut thereon, power driving means geared to said screw, control mechanism for the power driving means, a rotary shaft geared to said screw, a sleeve surrounding said shaft and having a screw threaded connection therewith, operative connections between the sleeve and the said controlling mechanism, a handle secured to the sleeve, and clutch mechanism between the handle and rotary shaft.

18. In a steering gear for vehicles and the like, the combination of angling mechanism, power-actuated means for driving said mechanism, controlling mechanism for said power-actuated means, a rotary shaft geared to the angling mechanism, a sleeve surrounding said shaft and having a screw-threaded connection therewith, operative connections between the sleeve and the said controlling mechanism, a hand wheel rigidly secured to the sleeve, and a clutch device on the hand wheel adapted to connect the latter to the rotary shaft.

19. In a steering gear for vehicles and the like, the combination of angling mechanism, power-actuated means for driving said mechanism, controlling mechanism for said power-actuated means, a rotary shaft geared to said angling mechanism, a sleeve surrounding said shaft, a grooved nut rigid with the sleeve and engaging threads of the said rotatable shaft, a strap engaging the groove of said nut, connections between said strap and said controlling mechanism, and means for turning the sleeve.

20. In a traction engine, the combination with the steering axle and angling mechanism therefor comprising a rotary shaft arranged transversely of the machine, of a motor geared to one end of said transverse shaft to drive the same, and manual driving means geared to the other end of the said transverse shaft.

21. In a traction engine, the combination with the steering gear and angling mechanism therefor comprising a rotary shaft arranged transversely of the machine, of a motor geared to one end of said transverse shaft to drive the same, a clutch device between the motor and the transverse shaft, and manual driving means geared to the other end of the transverse shaft.

22. In a traction engine, the combination with the steering axle and angling mechanism therefor comprising a rotatable shaft arranged transversely of the machine, of a motor geared to one end of said transverse shaft to drive the same, a manually operable rotatable shaft geared to the other end of said transverse shaft, controlling mechanism for the motor, means for operating said controlling mechanism comprising a sleeve surrounding the manually operable shaft, a handle mounted on the sleeve, and clutch mechanism between said handle and the manually operable shaft.

23. In a traction engine, the combination of the engine frame, the steering axle supporting the front end of said frame, angling mechanism for said axle comprising a transverse shaft mounted on the front part of the engine frame, a motor geared to one end of the transverse shaft, a rotary shaft geared to the other end of the transverse shaft, a sleeve threaded on said rotary shaft and extending to the rear end of the engine, an operator's handle on the sleeve, a control mechanism for the motor, and connections between the control mechanism and said sleeve comprising a transverse rocker shaft mounted on the engine frame.

In testimony whereof I affix my signature, in presence of two witnesses.

JOHN B. BARTHOLOMEW.

Witnesses:
A. L. GREGORY,
W. T. KINSELY.